United States Patent
Christensen et al.

(10) Patent No.: US 11,595,577 B2
(45) Date of Patent: Feb. 28, 2023

(54) SENSOR BLOCK

(71) Applicant: Micron Technology, Inc., Boise, ID (US)

(72) Inventors: Carla L. Christensen, Boise, ID (US); Zahra Hosseinimakarem, Boise, ID (US); Radhika Viswanathan, Boise, ID (US); Bhumika Chhabra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 18 days.

(21) Appl. No.: 17/006,534

(22) Filed: Aug. 28, 2020

(65) Prior Publication Data

US 2022/0070372 A1   Mar. 3, 2022

(51) Int. Cl.
| | |
|---|---|
| *H04N 5/232* | (2006.01) |
| *G06F 21/31* | (2013.01) |
| *H04N 1/44* | (2006.01) |
| *H04N 5/225* | (2006.01) |
| *G06F 21/74* | (2013.01) |

(52) U.S. Cl.
CPC ......... *H04N 5/23245* (2013.01); *G06F 21/31* (2013.01); *G06F 21/74* (2013.01); *H04N 1/4433* (2013.01); *H04N 5/2254* (2013.01); *H04N 2201/0084* (2013.01)

(58) Field of Classification Search
CPC .... G06F 1/1605; G06F 1/1686; G06F 21/567; G06F 21/6245–6263; G06F 21/70; G06F 21/71; G06F 21/73–77; G06F 21/82; G06F 21/83; H04M 1/0264
See application file for complete search history.

(56) References Cited

U.S. PATENT DOCUMENTS

| | | | |
|---|---|---|---|
| 2011/0242652 A1* | 10/2011 | Sahouani | G02B 5/201 |
| | | | 427/163.1 |
| 2012/0200790 A1* | 8/2012 | Henkinet | G02F 1/13306 |
| | | | 349/13 |
| 2016/0266417 A1* | 9/2016 | Liu | G02B 27/283 |
| 2016/0266418 A1* | 9/2016 | Huang | G03B 9/00 |
| 2016/0273908 A1* | 9/2016 | Rose | H04N 5/232 |
| 2018/0316835 A1* | 11/2018 | Files | H04N 5/2257 |
| 2019/0042769 A1* | 2/2019 | Sukhomlinov | G06F 21/6245 |
| 2020/0026140 A1* | 1/2020 | Chang | G02B 13/004 |

(Continued)

*Primary Examiner* — Paul M Berardesca
(74) *Attorney, Agent, or Firm* — Brooks, Cameron & Huebsch, PLLC (57) ABSTRACT

Embodiments of the present disclosure include apparatuses and methods for sensor blocking. In a number of embodiments, a method can include operating a sensor block of an apparatus in a first mode to allow a sensor to receive inputs, and operating the sensor block in a second mode to inhibit the sensor from receiving the inputs. A sensor block can be used to prevent a sensor, such as an image sensor, from receiving an input, such as a light source input, to capture image data. A sensor block can be used to prevent a sensor from capturing image data even when an application causing the sensor to operate, such as when applications have access to the sensor, but the user of a device is unaware that an application is using the sensor. The sensor block can be used to prevent the sensor from capturing useful images and the sensor can only capture a black image of the sensor block and not the surroundings of the device.

16 Claims, 4 Drawing Sheets

(56) References Cited

U.S. PATENT DOCUMENTS

| | | | |
|---|---|---|---|
| 2020/0108700 A1* | 4/2020 | Flanigan | G02F 1/0121 |
| 2020/0260183 A1 | 8/2020 | Stachura | |
| 2020/0264425 A1 | 8/2020 | Saito et al. | |
| 2020/0264656 A1 | 8/2020 | Song et al. | |
| 2021/0067716 A1* | 3/2021 | Zhou | H04N 5/2254 |
| 2021/0271856 A1* | 9/2021 | Kanas | H04N 5/2252 |
| 2021/0349366 A1* | 11/2021 | Chen | G02F 1/157 |

* cited by examiner

| OPERATING A SENSOR BLOCK THAT COMPRISES AN IMAGE SENSOR, A LENS, AND ONE OR MORE FILTERS IN A FIRST MODE THAT COMPRISES A FIRST CONFIGURATION OF THE ONE OR MORE FILTERS THAT ALLOWS AN IMAGE SENSOR TO RECEIVE LIGHT INPUTS VIA THE ONE OR MORE FILTERS AND THE LENS |—540|
|---|---|

| TRANSMITTING AN ELECTRICAL SIGNAL FROM A CONTROLLER TO THE ONE OR MORE FILTERS IN RESPONSE TO A USER INPUT OR OPERATION CONDITION COMMUNICATED TO THE CONTROLLER |—542|
|---|---|

| OPERATING, BASED AT LEAST IN PART ON THE ELECTRICAL SIGNAL FROM THE CONTROLLER, THE SENSOR BLOCK IN A SECOND MODE THAT COMPRISES A SECOND CONFIGURATION OF THE ONE OR MORE FILTERS THAT INHIBITS THE IMAGE SENSOR FROM RECEIVING LIGHT INPUTS VIA THE ONE OR MORE FILTERS AND THE LENS |—544|
|---|---|

FIG. 5 excuse# SENSOR BLOCK

TECHNICAL FIELD

The present disclosure relates generally to apparatuses, non-transitory machine-readable media, and methods for blocking a sensor.

BACKGROUND

Images can be viewed on computing devices. A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include sensors, such as an image sensor, to capture image data and a display used to view images and/or text. The display can be a touchscreen display that serves as an input device. When a touchscreen display is touched by a finger, digital pen (e.g., stylus), or other input mechanism, associated data can be received by the computing device.

DETAILED DESCRIPTION

Embodiments of the present disclosure include apparatuses and methods for sensor blocking. In a number of embodiments, a method can include operating a sensor block of an apparatus in a first mode to allow a sensor to receive inputs, and operating the sensor block in a second mode to inhibit the sensor from receiving the inputs. A sensor block can be used to prevent a sensor, such as an image sensor, from receiving an input, such as a light source input, to capture image data. A sensor block can be used to prevent a sensor from capturing image data even when an application causing to the sensor to operate, such as when applications have access to the sensor, but the user of a device is unaware that an application is using the sensor. The sensor block can be used to prevent the sensor from capturing useful images by inhibiting the amount of light that the sensor receives. Also, the sensor can only capture a black image of the sensor block and not the surroundings of the device.

A sensor block can comprise a filter made of a smart glass that is configured to receive signals (e.g., electrical signals) to operate in a first mode where the smart glass is transparent allowing the sensor to receive inputs and capture images of the surroundings of the device. The smart glass can be configured to receive signals to operate in a second mode where the smart glass is opaque inhibiting the sensor from receiving inputs to capture images of the surroundings of the device.

A sensor block can comprise an opaque portion (e.g., cover) that can be operated in a first mode where the opaque portion does not cover the sensor allowing the sensor to receive inputs and capture images of the surroundings of the device. The opaque portion can be operated in a second mode where the opaque portion covers the sensor inhibiting the sensor from receiving inputs to capture images of the surroundings of the device.

A sensor block can comprise a filter made of a stacked polarizer that can be operated in a first mode where the stacked polarizer is inactivated allowing the sensor to receive inputs and capture images of the surroundings of the device. The stacked polarizer can be operated in a second mode where a plurality of the polarizers of the stacked polarizers are activated inhibiting the sensor from receiving inputs to capture images of the surroundings of the device. A stacked polarizer can include a plurality of polarizers that are stacked upon each other such that a light source input can be pass through the stack of polarizers and be detected by a pixel of an image sensor. Each of the polarizers in the stack of polarizers can be individually activated and deactivated; and when a plurality of the polarizers are activated the polarizers can block the sensor from receiving a light source input.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of" "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 130 can reference element "30" in FIG. 1, and a similar element can be referenced as 220 in FIG. 2A. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
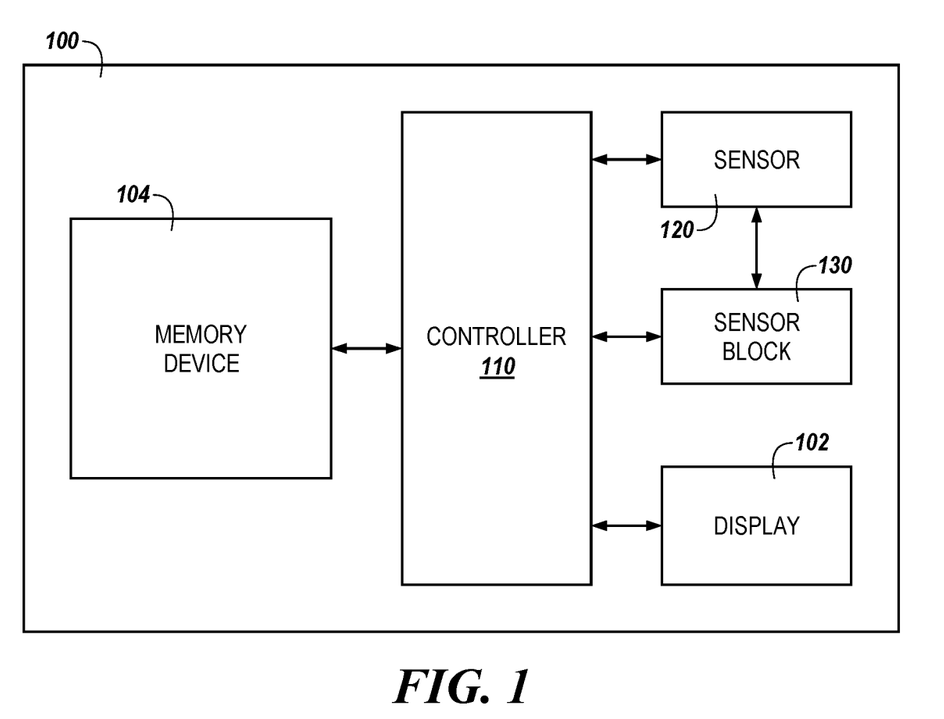
FIG. 1 is a functional block diagram in the form of an apparatus having a display, an image sensor, a memory device, and a controller in accordance with a number of embodiments of the present disclosure.

FIG. 1 is a functional block diagram in the form of a computing system including an apparatus 100 having a display 102, an image sensor 120, a memory device 104, and a controller 110 (e.g., a processor, control circuitry, hardware, firmware, and/or software) in accordance with a number of embodiments of the present disclosure. The memory device 104, in some embodiments, can include a non-transitory machine readable medium (MRM) configured to store instructions that can be executed by controller 110 to perform embodiments of the present disclosure.

The apparatus 100 can be a computing device and, for instance, the display 102 may be a touchscreen display of a mobile device such as a smartphone. The controller 110 can be communicatively coupled to the memory device 104, image sensor 120, and/or the display 102. As used herein, "communicatively coupled" can include coupled via various wired and/or wireless connections between devices such that data can be transferred in various directions between the devices. The coupling need not be a direct connection, and in some examples, can be an indirect connection.

The memory device 104 can include non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random access memory (SRAM), among others. Memory device 104 can include an array of memory cells configured to store bits of data and control circuitry configured to perform operations on the memory device 104 (e.g., read, write, erase bits of data in the array of memory cells).

Apparatus 100 can include an image sensor 120. For example, image sensor 120 can be part of a camera of a mobile device. The image sensor 120 can generate images (video, text, etc.) which can be visible on the display 102. Additionally, the image sensor 120 can capture and/or receive input from objects, people, items, etc. and transmit that input to the controller 110 to be analyzed. In some examples, the images sensor 120 can be part of a camera and can provide input to the controller 110, such as facial recognition input. The display 102 can be a portion of a mobile device including a camera (e.g., a smartphone) and the display 102 can be used to display information, such as application interface information and/or images captured by the sensor, among other information.

Sensor block 130 can be used to allow and/or inhibit the sensor 120 from capturing image data. Sensor block 130 can be operated in a first mode to allow a sensor to receive inputs and operated in a second mode to inhibit the sensor from receiving the inputs. Sensor block 130 can be used to prevent a sensor, such as an image sensor, from receiving an input, such as a light source input, to capture image data. Sensor block 130 can be used to prevent a sensor from capturing image data even when an application causing to the sensor to operate, such as when applications have access to the sensor, but the user of a device is unaware that an application is using the sensor. Sensor block 130 can be used to prevent the sensor from capturing useful images and the sensor can only capture a black image of the sensor block and not the surroundings of the device.

Sensor block 130 can be configured to be controlled to operate in a first mode and/or a second mode based upon recognition data, time, location, and/or settings on a device. For example, controller 110 can received recognition data (e.g., an image of a user's face/eyes and/or a user's fingerprint). Controller 110 can authenticate the recognition data and allow access to control the sensor block 130, such that sensor block 130 can be operated in a first mode allowing sensor 120 to receive inputs to capture image data of the surroundings of the apparatus 100; or the sensor block 130 can be operated in a second mode inhibiting sensor 120 from receiving inputs to capture image data of the surroundings of the apparatus 100.

Controller 110 can also be configured to allow access to control sensor block based on time periods. For example, controller 110 can be configured to operate sensor block 130 in a second mode inhibiting sensor 120 from receiving inputs to capture image data of the surroundings of the apparatus 100 during working hours and operate sensor block 130 in a first mode allowing sensor 120 to receive inputs to capture image data of the surroundings of the apparatus 100 outside of work hours.

Controller 110 can also be configured to allow access to control sensor block based a location of apparatus 100. For example, controller 110 can be configured to operate sensor block 130 in a second mode inhibiting sensor 120 from receiving inputs to capture image data of the surroundings of the apparatus 100 when apparatus 100 is located in a first particular location, such as at a user's workplace; and operate sensor block 130 in a first mode allowing sensor 120 to receive inputs to capture image data of the surroundings of the apparatus 100 in a second particular location, such as at a user's home.

Figure 2A:
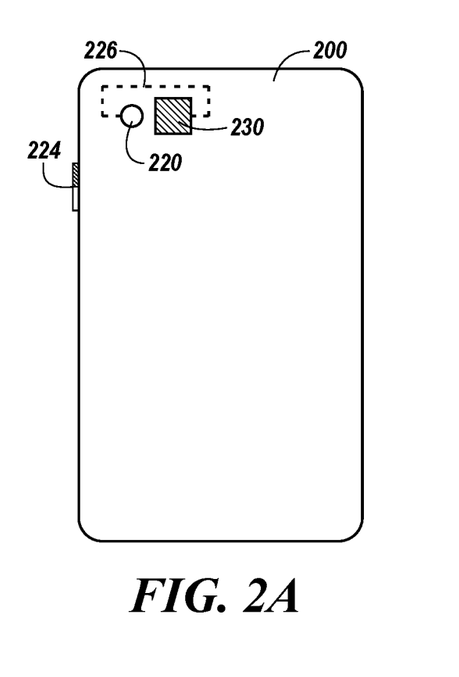
FIG. 2A is a diagram representing an example of a sensor block in a first mode in accordance with a number of embodiments of the present disclosure.

FIG. 2A is a diagram representing an example of a sensor block in a first mode in accordance with a number of embodiments of the present disclosure. In FIG. 2A, sensor block 230 of apparatus 200 is in a first mode where sensor block is in a first position. The first position does not bock sensor 220 allowing sensor 220 to receive inputs (e.g., light source inputs) to capture image data of the surroundings of apparatus 100. Sensor block 230 can be comprised of an opaque material that is capable of blocking lights, such as plastic and/or metal, for example.

Figure 2B:
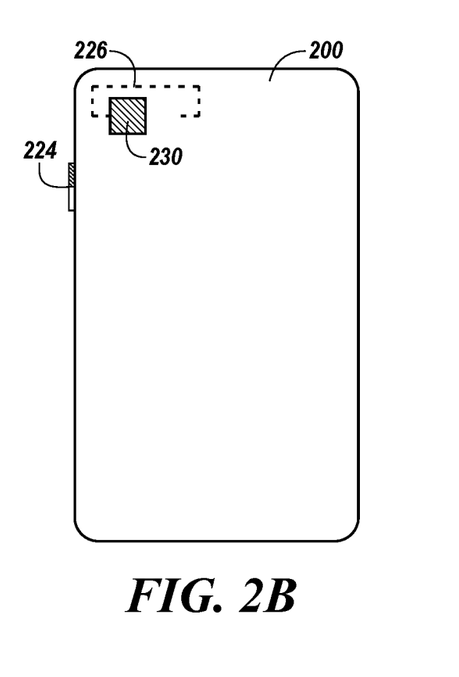
FIG. 2B is a diagram representing an example of a sensor block in a second mode in accordance with a number of embodiments of the present disclosure.

FIG. 2B is a diagram representing an example of a sensor block in a second mode in accordance with a number of embodiments of the present disclosure. In FIG. 2B, sensor block 230 of apparatus 200 is in a second mode where sensor block is in a second position. The second position bocks sensor 220 inhibiting sensor 220 from receiving inputs (e.g., light source inputs) to capture image data of the surroundings of apparatus 200.

Sensor block 230 can be placed into and/or moved between the first and second positions manually by sliding sensor block 230 with a user's finger. Also, sensor block 230 can placed in the first position by an actuator that configured to move sensor block 230 between a first position (shown in FIG. 2A) and a second position (shown in FIG. 2B). Sensor block 230 can be selected to be in the first or second mode based on a setting of an application operated by apparatus 200 and/or a position of switch 224 on apparatus 200. For example, switch 224 on a side of apparatus 200 can be in a first position in FIG. 2A or a second position in FIG. 2B, where when the switch is in a first position, the sensor block is in the first position; and when the switch is in a second position, the sensor bock is in the second position. Moving the switch between the first and second positions causes actuator 226 to move sensor block 230 between the first and second positions.

Figure 3A:
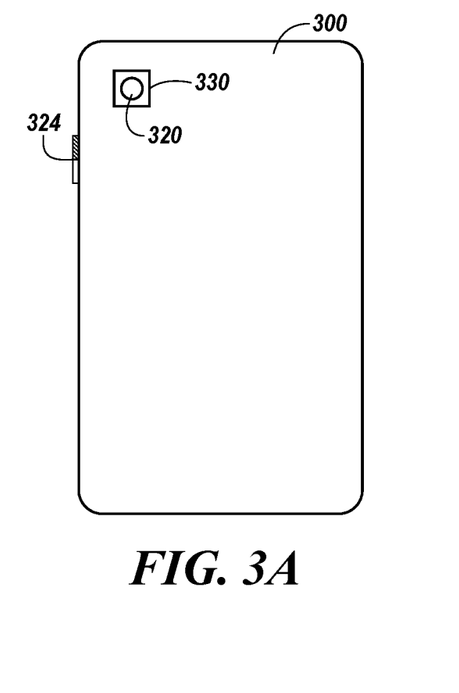
FIG. 3A is a diagram representing an example of a sensor block in a first mode in accordance with a number of embodiments of the present disclosure.

FIG. 3A is a diagram representing an example of a sensor block in a first mode in accordance with a number of embodiments of the present disclosure. Sensor block 330 can be comprised of smart glass that is capable of transitioning between opaque and transparent based upon signals that are provided to the smart glass by a controller (e.g. controller 110 in FIG. 1). In FIG. 3A, sensor block 330 of apparatus 300 is in a first mode where sensor block 320 is transparent. When sensor block 330 is in the first mode where the smart glass is transparent, sensor block 330 does not bock sensor 320 allowing sensor 320 to receive inputs (e.g., light source inputs) to capture image data of the surroundings of apparatus 300. Smart glass can include electrochromic, photochromic, thermochromic, suspended-particle, micro-blind, and/or polymer-dispersed liquid-crystal smart glass, among other types of smart glass. For example, the smart glass can include electrochromic glass that includes tungsten oxide and polyvinyl butyral between layers of glass and fluorine-doped tin oxide-coated glass.

Figure 3B:
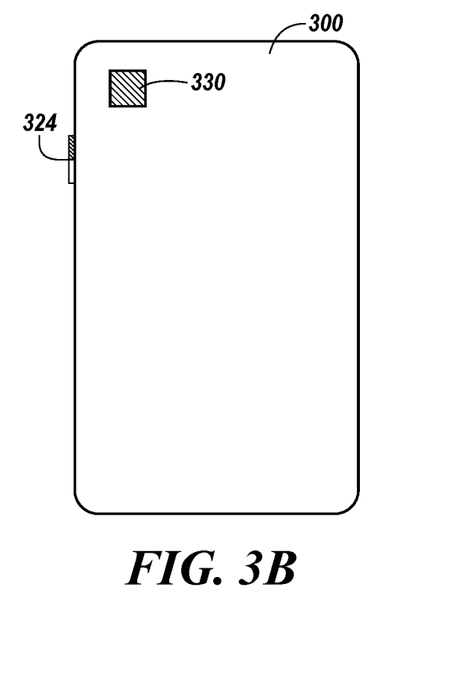
FIG. 3B is a diagram representing an example of a sensor block in a second mode in accordance with a number of embodiments of the present disclosure.

FIG. 3B is a diagram representing an example of a sensor block in a second mode in accordance with a number of embodiments of the present disclosure. Sensor block 330 can be comprised of smart glass that is capable of transitioning between a first configuration that is opaque and a second configuration that is transparent based upon signals (e.g., electrical signals) that are provided to the smart glass by a controller (e.g. controller 110 in FIG. 1). In FIG. 3B, sensor block 330 of apparatus 300 is in a second mode where sensor block 220 is opaque. When sensor bock 330 is in the second mode where the smart glass is opaque, sensor block 330 blocks sensor 320 inhibiting sensor 320 from receiving inputs (e.g., light source inputs) to capture image data of the surroundings of apparatus 300. Sensor block 330 can be selected to be in the first or second mode based on a setting of an application operated by apparatus 300 and/or a position of switch 324 on apparatus 300. For example, switch 324 on a side of apparatus 300 can be in a first position in FIG. 3A or a second position in FIG. 3B, where when the switch is in a first position, the sensor block is in the first mode; and when the switch is in a second position, the sensor bock is in the second mode. Moving the switch between the first and second positions can cause sensor block 330 to transition between the first and second modes.

Figure 4A:
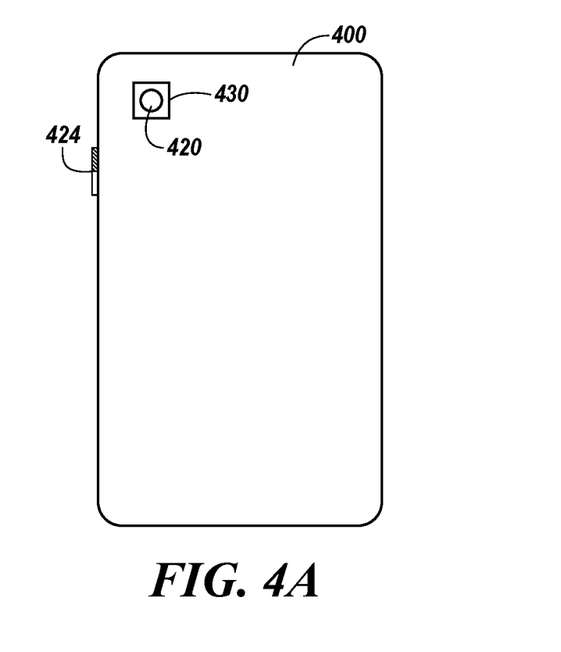
FIG. 4A is a diagram representing an example of a sensor block in accordance with a number of embodiments of the present disclosure.

FIG. 4A is a diagram representing an example of a sensor block in accordance with a number of embodiments of the present disclosure. Sensor block 430 can be comprised of a filter that includes a stacked polarizer that can be activated to block sensor 420 from receiving inputs and inactivated to allow sensor 420 to receive inputs. When sensor block 430 is in the first mode where the stacked polarizer is in a first configuration and inactivated, sensor block 430 does not bock sensor 420 allowing sensor 420 to receive inputs (e.g., light source inputs) to capture image data of the surroundings of apparatus 300. In the first mode when the stacked polarizer is inactivated, the inputs are not polarized and sensor 420 received inputs (e.g., light source inputs) to capture image data. When sensor block 430 is in the second mode where the stacked polarizer is in a second configuration and activated, sensor block 430 inhibits sensor 420 from receiving inputs (e.g., light source inputs) to capture image data of the surroundings of apparatus 400. In the second mode when the stacked polarizer is activated, the inputs are polarized such that sensor 420 does not receive inputs to capture image data. Sensor block 430 can be selected to be in the first or second mode based on a setting of an application operated by apparatus 400 and/or a position of switch 424 on apparatus 400. For example, switch 424 on a side of apparatus 300 can be in a first position as shown in FIG. 4A or a second position (for example, the second position is shown in FIGS. 2B and 3B), where when the switch is in a first position, the sensor block is in the first mode; and when the switch is in a second position, the sensor bock is in the second mode. Moving the switch between the first and second positions can cause sensor block 430 to transition between the first and second modes.

Figure 4B:
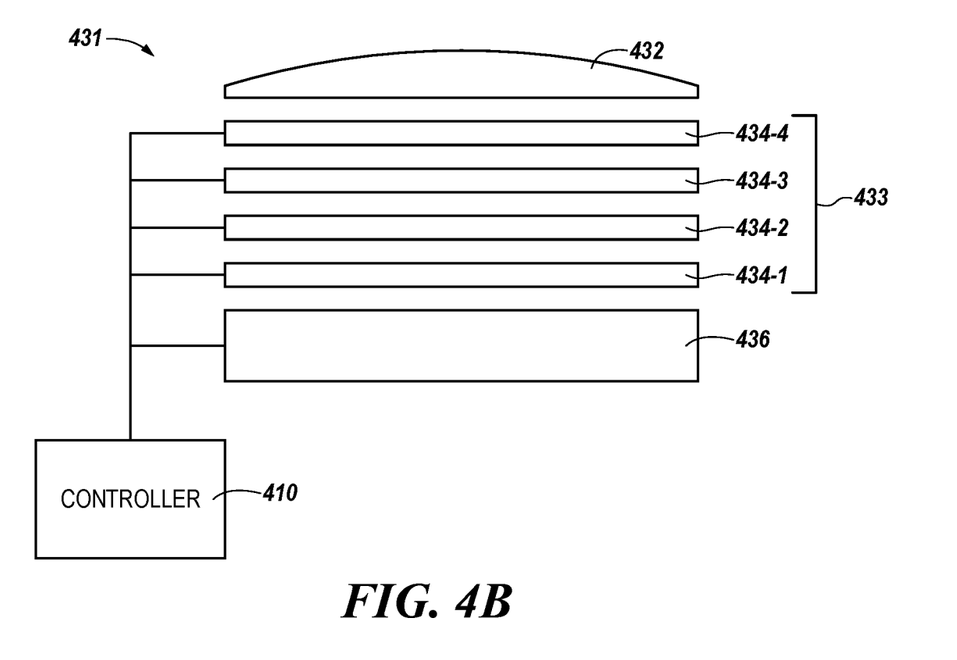
FIGS. 4B-4C are diagrams representing examples of a stacked polarizer sensor block in accordance with a number of embodiments of the present disclosure.
Figure 4C:
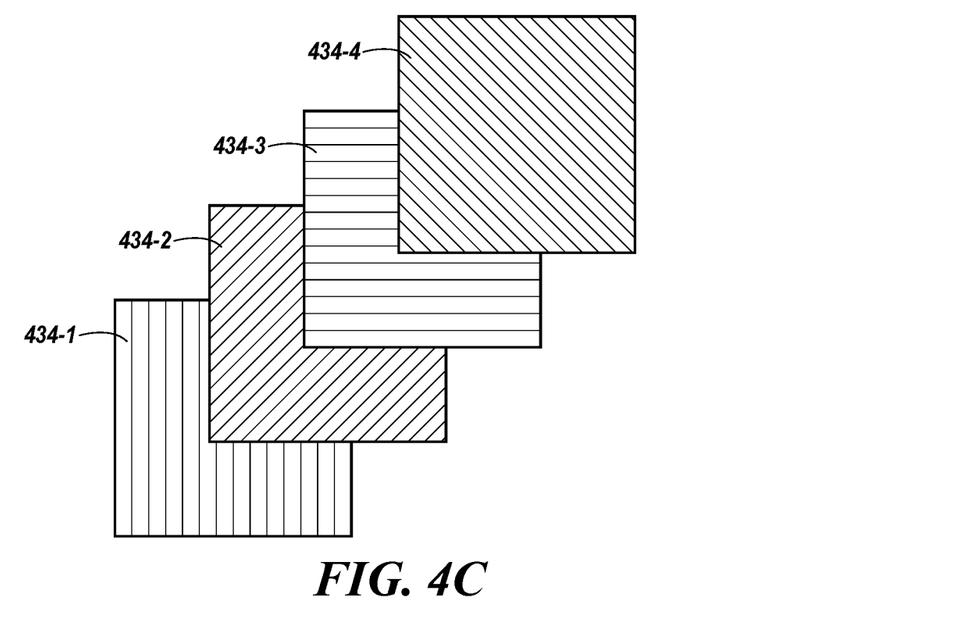

FIGS. 4B-4C are diagrams representing examples of a stacked polarizer sensor block in accordance with a number of embodiments of the present disclosure. In FIG. 4B, an image sensor 431 can include a lens 432, a sensor block comprising a stacked polarizer 433, and pixels 436 to detect light source inputs. Stacked polarizer 433 can include a first polarizer 434-1, a second polarizer 434-2, a third polarizer 434-3, and a fourth polarizer 434-4. First polarizer 434-1, second polarizer 434-2, third polarizer 434-3, and fourth polarizer 434-4 can be coupled to controller 410 and can be configured to receive signals (e.g., electrical signals) from controller 410 to activate and deactivate the polarizers.

In a number of embodiments, controller 410 can send a signal or signals to individually activate and/or deactivate the first, second, third, and fourth polarizers. In a number of embodiments, stacked polarizer 433 can be operated in a first mode where the first, second, third, and fourth polarizers 434-1, 434-2, 434-3, and 424-4 are deactivated, and pixels 436 can detect the light source and generate unpolarized image data. In a number of embodiments, stacked polarizer 433 can be operated in a second mode where a plurality of the first, second, third, and fourth polarizers 434-1, 434-2, 434-3, and/or 424-4 inhibiting pixel 436 from detecting the light source and generating image data.

In FIG. 4C, first polarizer 434-1 can be configured to polarize light sources at 0°, second polarizer 434-2 can be configured to polarize light sources at 45°, third polarizer 434-3 can be configured to polarize light at 90°, and fourth polarizer 434-4 can be configured to polarize light at 135°. Stacked polarizer can include any number of polarizers that can be configured to polarize light sources at any angle. For example, stacked polarizer can block light source inputs from the image sensor when two polarizers are turned on that are configured to polarizers at angles that are perpendicular to each other, such as 0° and 90° or 45° and 135°.

Figure 5:
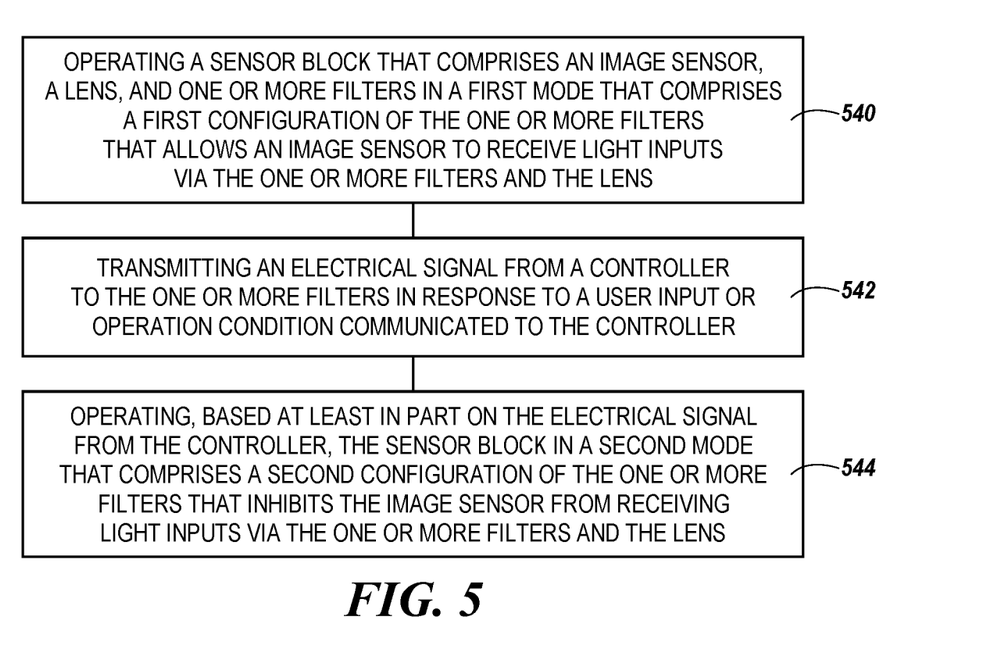
FIG. 5 is flow diagram representing an example method for sensor blocking in accordance with a number of embodiments of the present disclosure.

FIG. 5 is flow diagram representing an example method for sensor blocking in accordance with a number of embodiments of the present disclosure. At step 540, the method can include operating a sensor block that comprises an image sensor, a lens, and one or more filters in a first mode that comprises a first configuration of the one or more filters that allows an image sensor to receive light inputs via the one or more filters and the lens. At step 542, the method can include transmitting an electrical signal from a controller to the one or more filters in response to a user input or operation condition communicated to the controller. At step 544, the method can include operating, based at least in part on the electrical signal from the controller, the sensor block in a second mode that comprises a second configuration of the one or more filters that inhibits the image sensor from receiving light inputs via the one or more filters and the lens.

The method can include operating the sensor block in the first mode in response to receiving and authenticating recognition data and operating the sensor block in the second mode in response to the apparatus lacking authenticated recognition data.

The method can include operating the sensor block in the first mode in response to the apparatus being in a particular location and operating the sensor block in the second mode in response to the apparatus being in a location other than the particular location. For example, the sensor block can operate in the first mode while outside of work and in the second mode when at work.

The method can include operating the sensor block in the first mode during a particular time period, such as outside of work hours, and operating the sensor block in the second mode during a time other than the particular time period, such as during work hours.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    operating a sensor block that comprises an image sensor, a lens, and one or more filters in a first mode that comprises a first configuration of the one or more filters that allows an image sensor to receive light inputs via the one or more filters and the lens;
    transmitting electrical signals from a controller to the one or more filters in response to a user input or operation condition communicated to the controller; and
    operating, based at least in part on the electrical signals from the controller, the sensor block in a second mode that comprises a second configuration of the one or more filters that inhibits the image sensor from receiving light inputs via the one or more filters and the lens, wherein the one or more filters includes a stacked polarizer with a first polarizer and a second polarizer that are activated to polarize light inputs by the electrical signals from the controller; and
    wherein the stacked polarizer is configured to polarize the light inputs at a plurality of angles when activated with the electrical signals; and wherein the stacked polarizer is configured to pass unpolarized light inputs when deactivated with the electrical signals.

2. The method of claim 1, further including operating the sensor block in the first mode in response to receiving and authenticating recognition data.

3. The method of claim 1, further including operating the sensor block in the second mode in response to the apparatus lacking authenticated recognition data.

4. The method of claim 1, further including operating the sensor block in the first mode in response to the apparatus being in a particular location.

5. The method of claim 4, further including operating the sensor block in the second mode in response to the apparatus being in a location other than the particular location.

6. The method of claim 1, further including operating the sensor block in the first mode in response to a switch being a first position.

7. The method of claim 1, further including operating the sensor block in the first mode in response to a switch being a second position.

8. The method of claim 1, further including operating the sensor block in the first mode during a particular time period that corresponds to a work shift.

9. The method of claim 8, further including operating the sensor block in the second mode during another time period other than the particular time period that corresponds to a time outside of the work shift.

10. A non-transitory machine-readable medium comprising instructions executable to:
    operate a sensor block of an apparatus in a first mode based on a first number of criteria, wherein the first mode allows a sensor to receive inputs, wherein the sensor block includes a stacked polarizer with a first polarizer and a second polarizer that are deactivated in response to receiving a first electrical signal, wherein the stacked polarizer is configured to pass unpolarized inputs when deactivated with the first electrical signal; and
    operate the sensor block in a second mode based on a second number of criteria, wherein the second mode inhibits the sensor from receiving the inputs, wherein the sensor block includes the stacked polarizer with the first polarizer and the second polarizer that are activated in response to receiving a second electrical signal, wherein the stacked polarizer is configured to polarize light at a plurality of angles when the first polarizer and the second polarizer are activated with the second electrical signal.

11. The medium of claim 10, further comprising instructions to operate the sensor block in the first mode based on the first number of criteria comprising at least one criteria selected from the group consisting of: the apparatus receiving and authenticating recognition data, the apparatus being in a first particular location, a switch being in a first position, the inputs being provided during a first time period.

12. The medium of claim 10, further comprising instructions to operate the sensor block in the second mode based on the second number of criteria comprising at least one criteria selected from the group consisting of: the apparatus lacking authenticated recognition data, the apparatus being in a second particular location, a switch being in a second position, the inputs being provided during a second time period.

13. The medium of claim 10, further comprising instructions to provide the first signal to the sensor block to operate in the first mode by deactivating a number of polarizers.

14. The medium of claim 10, further comprising instructions to provide the second signal to the sensor block to operate in the second mode by activating a number of polarizers.

15. An apparatus, comprising:
a memory device coupled to a controller;
an image sensor coupled to the controller;
a sensor block coupled to the controller wherein the sensor block includes a stacked polarizer with a first polarizer and a second polarizer; and
the controller coupled to the memory device, the image sensor, and the sensor block, wherein the controller is configured to:
send a first signal to the first polarizer and the second polarizer to cause the sensor block to operate in a first mode to allow the image sensor to receive inputs, wherein the first polarizer and the second polarizer configured to pass unpolarized inputs when deactivated with the first signal; and
send a second signal to the first polarizer and the second polarizer to cause the sensor block to operate in a second mode to inhibit the image sensor from receiving the inputs, wherein the first polarizer and the second polarizer are configured to polarize light at a plurality of angles when the first polarizer and the second polarizer are activated with the second signal.

16. The apparatus of claim 15, wherein the sensor block includes a number of polarizers that are inactive when the sensor block is in the first mode and are activated when the sensor block is in the second mode.

* * * * *